Oct. 6, 1925.
R. C. STEVENSON
AUTOMATIC CLUTCH LOCK
Filed April 2, 1924
1,556,044
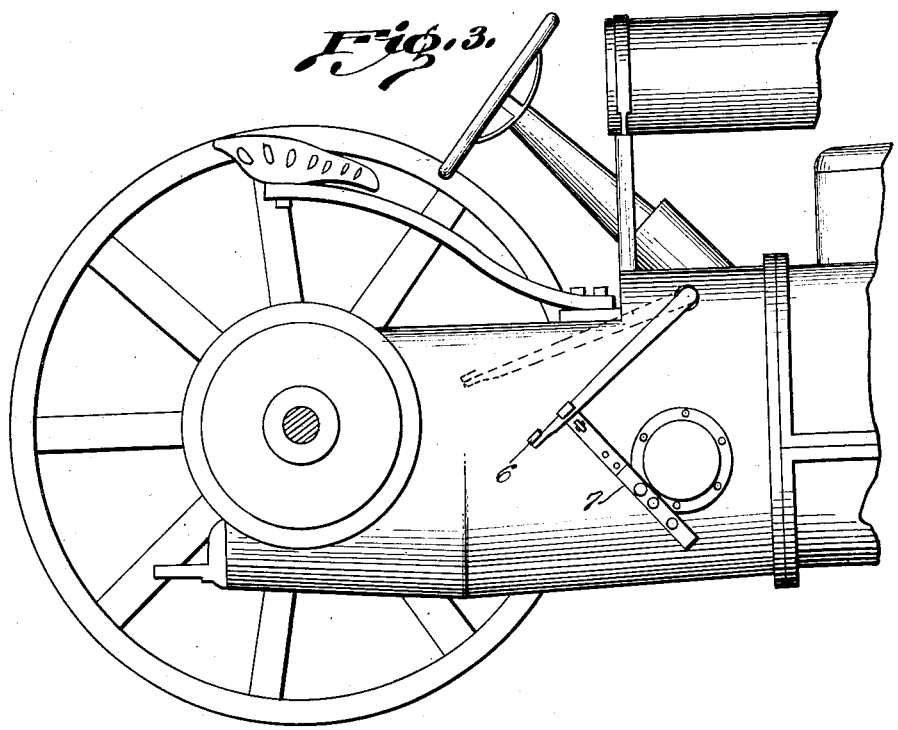
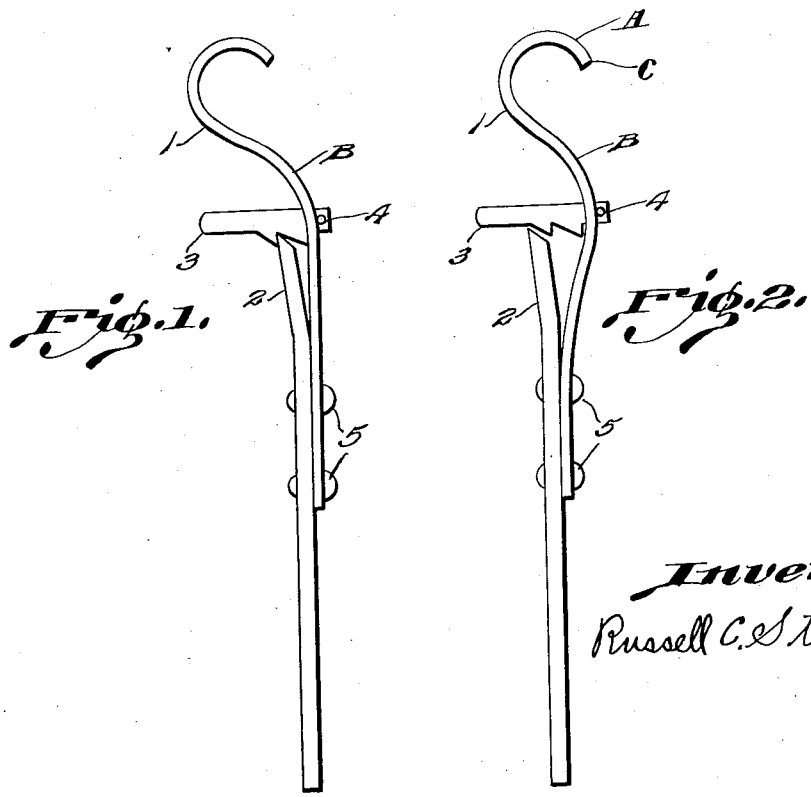
Inventor
Russell C. Stevenson Patented Oct. 6, 1925.

1,556,044

UNITED STATES PATENT OFFICE.

RUSSELL C. STEVENSON, OF OAKLAND, OREGON.

AUTOMATIC CLUTCH LOCK.

Application filed April 2, 1924. Serial No. 703,686.

*To all whom it may concern:*

Be it known that I, RUSSELL C. STEVENSON, a citizen of the United States, residing at Oakland, in the county of Douglas and State of Oregon, have invented a new and useful Automatic Clutch Lock, of which the following is a specification.

The invention relates to improvements in automatic clutch locking devices in which a spring steel hook operates in conjunction with the clutch pedal arm of the tractor; and the objects of the improvements are first, to provide a simple device to automatically engage and retain the clutch pedal as it is moved to released position; second, means whereby the pedal thus retained may be automatically released and returned to engaged position, together with means for automatically securing the device in inactive position to allow free action of the clutch pedal.

This device is illustrated in the accompanying drawings in which:—

Figure 1, is a vertical rear edge view in position to allow free action of the clutch pedal.

Figure 2, is a vertical rear edge view in position to engage and retain the clutch pedal as it is moved to released position.

Figure 3, is a side elevation of a tractor showing the device attached thereto.

The invention comprises a spring steel hook 1, secured to a bar 2, by rivets 5, a latch 3, is loosely mounted in a slot 8, in hook 1, and is held in place by a pin 4.

It will be readily seen that my invention is a complete unit, to be mounted on the right side of the transmission and attached thereto by one of the bolts which hold the foot rest plate as shown in Figure 3, this bolt passes through one of the holes in the lower end of bar 2, (Fig. 3,) there being three or more of these holes (three in the present instance) so the device can be adjusted to the tractor.

When the device is attached to the tractor the point of hook 1, marked C, (Fig. 2,) is turned away from the tractor or to the right and the point marked A, is directly under the clutch pedal arm.

The operation of my invention is as follows.

If the device is in inactive position as shown in Figure 1, and it is desired to make use of it it will first be necessary to trip latch 3, this is done by raising it up until it clears the end of bar 2, hook 1, will then spring to the position shown in Figure 2, in this position hook 1, will engage and retain the clutch pedal arm as it is moved to released position.

As the clutch pedal is moved downward the pedal arm will strike hook 1, at the point marked A, (Fig. 2,) this will cause hook 1, to spring to the left until the pedal arm passes the point marked C. Hook 1, will then spring to the right. Hook 1, is now in the same position it was in before being sprung to the left by the descending pedal arm.

The clutch pedal is now in released position and as hook 1, is hooked over the top of the pedal arm it cannot return to engaged position when the foot is removed.

When it is desired to again engage the clutch it is only necessary to move the clutch pedal still farther downward as the clutch pedal moves downward the pedal arm will strike hook 1, at the point marked B, (Fig. 2,) this will cause hook 1, to spring to the left until latch 3, drops over the end of bar 2. Hook 1, is now in position shown in Figure 1, and will be retained in this position by latch 3. The clutch pedal is now free to return to engaged position.

The device is left in this position until it is again desired to make use of it, as in this position the clutch pedal is entirely free to be released and engaged as is necessary when driving the tractor.

In Figure 3 my invention is designated by 7, 6, designates the clutch pedal in released position and the dotted outline shows the clutch pedal in engaged position.

I claim:

1. In a clutch locking device, the combination of a spring steel hook, a bar to which said hook is attached, and a latch secured to said hook, said latch being so shaped as to automatically raise up and drop over the end of said bar as said hook is moved to inactive position.

2. In a device of the character described, which operates in conjunction with a clutch controlling pedal, a spring steel hook for retaining said pedal in clutch disengaging position, a supporting bar to which said hook is attached, a latch secured to said hook and adapted to engage said bar to retain the hook out of the path of movement of the clutch pedal, a projecting end on the latch for tripping the same with the hand, said spring steel hook being so shaped as to automatically engage the clutch pedal arm when said pedal is moved to released position, and said latch is disengaged from said bar, said hook having an inclined surface adapted on further depression of the clutch pedal to move said hook to inactive position and cause said latch to engage said bar.

RUSSELL C. STEVENSON.